(12) United States Patent
Ohba (10) Patent No.: US 7,692,662 B2
(45) Date of Patent: Apr. 6, 2010

(54) GRAPHIC PROCESSING APPARATUS AND METHOD

(75) Inventor: Akio Ohba, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 699 days.

(21) Appl. No.: 11/328,431

(22) Filed: Jan. 9, 2006

(65) Prior Publication Data

US 2006/0170681 A1  Aug. 3, 2006

Related U.S. Application Data

(63) Continuation of application No. PCT/JP2005/013181, filed on Jul. 15, 2005.

(30) Foreign Application Priority Data

Nov. 1, 2004  (JP) ............................. 2004-318362

(51) Int. Cl.
*G09G 5/00* (2006.01)
(52) U.S. Cl. .................................... 345/584
(58) Field of Classification Search .................. 345/584
See application file for complete search history.

(56) References Cited

U.S. PATENT DOCUMENTS

| | | | | |
|---|---|---|---|---|
| 6,163,319 | A * | 12/2000 | Peercy et al. ............. | 345/426 |
| 6,525,740 | B1 * | 2/2003 | Cosman ................... | 345/584 |
| 2002/0158869 | A1 | 10/2002 | Ohba et al. | |
| 2006/0170681 | A1 * | 8/2006 | Ohba ....................... | 345/426 |

FOREIGN PATENT DOCUMENTS

| | | |
|---|---|---|
| EP | 1331606 | 7/2003 |
| GB | 2353453 | 2/2001 |
| JP | 2001-266174 | 9/2001 |
| JP | 2002-203255 | 7/2002 |

(Continued)

OTHER PUBLICATIONS

International Preliminary Report on Patentability and Written Opinion of the International Searching Authority, dated Jun. 5, 2007, from the corresponding International Application.

(Continued)

*Primary Examiner*—Aaron M Richer
(74) *Attorney, Agent, or Firm*—Katten Muchin Rosenman LLP (57) ABSTRACT

A normal vector mapping unit maps a texture of the MIP-map level corresponding to a level of detail (LOD) of a polygon onto a polygon surface to generate a pseudo-normal vector on the polygon surface. A normal vector replacing unit refers to the vector quantization (VQ) table of the relevant MIP-map level and replaces the pseudo-normal vector on the polygon surface with a quantized reference normal vector. A brightness value acquiring unit refers to the color lookup table (CLUT) of the relevant MIP-map level, and acquires the brightness value corresponding to the reference normal vector on the polygon surface. The brightness value acquiring unit also interpolates brightness values between different MIP-map levels. A graphic processor combines the RGB value of each pixel of the polygon surface with the brightness value acquired by the brightness value acquiring unit to write the combined data into a frame buffer.

12 Claims, 6 Drawing Sheets

FOREIGN PATENT DOCUMENTS

JP          2004-252603          9/2004

OTHER PUBLICATIONS

Supplementary European Search Report and Annex to the European Search Report dated Oct. 21, 2009 for the corresponding European Application EP 05 76 6471.

Kilgard M.J., " A practical and robust bump-mapping technique for today's GPUs", Jul. 5, 2000, pp. 1-39, Game Development Congress.

Kugler A., " Designing a high performance texturing circuit", Feb. 12, 1997, pp. 302-311, Proceedings of the SPIE, SPIE, Bellingham, VA, US.

* cited by examiner

| LEVEL 0 | | | |
|---|---|---|---|
| INDEX | x-COORDINATE | y-COORDINATE | z-COORDINATE |
| 1 | x1 | y1 | z1 |
| 2 | x2 | y2 | z2 |
| 3 | x3 | y3 | z3 |
| 4 | x4 | y4 | z4 |
| 5 | x5 | y5 | z5 |
| ⋮ | ⋮ | ⋮ | ⋮ |
| 256 | x256 | y256 | z256 |

| LEVEL 0 | |
|---|---|
| INDEX | BRIGHTNESS VALUE |
| 1 | $\alpha 1$ |
| 2 | $\alpha 2$ |
| 3 | $\alpha 3$ |
| 4 | $\alpha 4$ |
| 5 | $\alpha 5$ |
| ⋮ | ⋮ |
| 256 | $\alpha 256$ |

GRAPHIC PROCESSING APPARATUS AND METHOD

CROSS-REFERENCE TO RELATED APPLICATION

This application is a continuation of International Application PCT/JP2005/013181 filed on Jul. 15, 2005, pending at the time of filing of this continuation application and claims priority from Japanese Patent Application 2004-318362 filed on Nov. 1, 2004, the contents of which are herein wholly incorporated by reference.

BACKGROUND OF THE INVENTION

1. Field of the Invention

The present invention relates to a graphic processing technology in computer graphics, and in particular, to a graphic processing apparatus and a method for mapping a normal vector onto a surface of an object on which graphic processing is performed.

2. Description of the Related Art

In three-dimensional computer graphics, generally a polygon model is used in which an object in three-dimensional space is represented by multiple polygons. In graphic processing of a polygon model, shading is performed on a polygon surface in consideration of a light source, a view point position, the reflectivity of an object surface, and other factors. To create a highly realistic image, texture mapping is also performed in which a texture image is applied to a surface of a polygon model.

Although an image created by texture mapping can significantly enhance the expressiveness of color, it cannot express roughness of a surface of an object. As a method of easily expressing roughness of a surface of an object, there is a method called bump mapping that uses an idea of texture mapping. In bump mapping, normal vectors are mapped onto a surface of an object in place of a texture to generate pseudo-normal vectors on the surface of the object. Assuming that the pseudo-normal vectors thus generated match normal line directions of the surface of the object, shading processing is performed and brightness values of the surface are obtained to make a shade. A fake roughness is thereby created on the surface of the object.

In texture mapping, in order to reduce the amount of data of a texture image, an index color scheme is often employed in which each pixel of a texture does not have a color value, but has the index of the color value and converts it to an actual color with reference to a color lookup table when the texture mapping is performed. In this scheme, color samples that previously define color values are prepared as a color lookup table, and each pixel of a texture stores only index information to be used for referring to the color lookup table. When the color samples to be used have 256 colors, for example, since it suffices for each pixel of a texture to store only an index with as many as 8 bits, the amount of data required for a texture image can be significantly reduced, thereby saving the amount of memory to be used for the texture mapping.

In Japanese Patent Laid-Open Publication No. 2002-203255, the present applicant has proposed a bump mapping method that uses a color lookup table used for color conversion in the texture mapping as a reference table for normal vectors.

Although bump mapping can easily express roughness without minutely modeling a surface of an object, a normal vector must be mapped onto each pixel of an object surface and brightness calculations must be performed for all the normal vectors, resulting in a high calculation cost and a time-consuming process. Further, the amount of memory to be used increases because the normal vectors are stored on a pixel basis. In the bump mapping method that utilizes a color lookup table proposed in Japanese Patent Laid-Open Publication No. 2002-203255, since normal vectors are quantized to less number of reference normal vectors, the calculation cost can be prevented from increasing and the amount of memory to be used can be reduced. Although the quantization of normal vectors has been able to solve the problems of the processing speed and memory capacity, there is still room for improving the image quality.

SUMMARY OF THE INVENTION

The present invention addresses the problems described above, with a general purpose of providing a graphic processing technology using the bump mapping that has a high processing efficiency and a high image quality.

To solve the above problems, one embodiment of the present invention is a graphic processing apparatus. The apparatus comprises: a normal map memory unit which stores a plurality of normal maps, each having a normal vector as an element and a different resolution, on a resolution level basis; a normal vector mapping unit which maps the normal map of a resolution level corresponding to a level of drawing detail of a surface of a target object onto the surface to generate a pseudo-normal vector on the surface; a plurality of quantization tables prepared on the resolution level basis, storing a set of reference normal vectors quantizing normal line directions of the surface and having different combinations of vector values on the resolution level basis; and a normal vector replacing unit which refers to the quantization table of the resolution level corresponding to the level of drawing detail and replaces the pseudo-normal vector generated on the surface with either one of the reference normal vectors in the quantization table.

According to this embodiment, since the plurality of normal maps storing normal vectors are prepared on a resolution level basis, the resolution level matching the level of drawing detail of a polygon surface can be selected to map the normal map onto a surface of a target object. Further, since the pseudo-normal vector is quantized using the quantization table prepared on a resolution level basis, the amount of the brightness calculation can be reduced and also a quantization error can be prevented to improve the image quality.

The apparatus may further comprise: a plurality of lookup tables prepared on the resolution level basis, storing indices of the reference normal vectors stored in the quantization tables on the resolution level basis, and brightness values of the surface obtained when normal line directions of the surface of the target object are given by the reference normal vectors, in correspondence to each other; and a brightness value acquiring unit which refers to the lookup table of the resolution level corresponding to the level of drawing detail and acquires the brightness value corresponding to the reference normal vector formed on the surface.

The use of the lookup table eliminates the need for storing the values of reference normal vectors as a normal map, thereby reducing the memory capacity necessary for processing. In addition, since different lookup tables are prepared on a resolution level basis and the lookup table is used that corresponds to the level of drawing detail of a target object, an image can be created with an image quality matching the level of drawing detail of the target object.

A final brightness value of the surface may also be obtained in such a way that: the normal vector mapping unit selects the normal maps of at least two different resolution levels corresponding to the levels of drawing detail and maps the respective normal maps onto the surface to generate a pseudo-normal vector of each resolution level on the surface; the normal vector replacing unit refers to the quantization tables of the at least two different resolution levels and replaces the pseudo-normal vectors of the respective resolution levels generated on the surface with either the reference normal vectors in the quantization tables of the respective resolution levels; and the brightness value acquiring unit refers to the lookup tables of the at least two different resolution levels, acquires the brightness values corresponding to the reference normal vectors of the respective resolution levels generated on the surface, and interpolates the acquired brightness values between the at least two different resolution levels.

The brightness values are thus interpolated between the resolution levels using the quantization tables that are different from resolution level to resolution level, whereby an effect of a quantization error of the pseudo-normal vector can be reduced and the image quality can be improved.

Another embodiment of the invention is a graphic processing method. The method comprises: mapping a normal map of a resolution level corresponding to a level of drawing detail of a surface of a target object onto the surface to generate a pseudo-normal vector on the surface, the normal map being selected from a plurality of normal maps each having a normal vector as an element and a different resolution; replacing the pseudo-normal vector with a quantized reference normal vector by performing quantization depending on the resolution level on the pseudo-normal vector generated on the surface; and acquiring a brightness value of the surface on the assumption that a normal line direction of the surface is given by the reference normal vector formed on the surface.

Still another embodiment of the invention is a program. The program makes a computer execute: mapping a normal map of a resolution level corresponding to a level of drawing detail of a surface of a target object onto the surface to generate a pseudo-normal vector on the surface, the normal map being selected from a plurality of normal maps each having a normal vector as an element and a different resolution; referring to a quantization table of the resolution level corresponding to the level of drawing detail, among a plurality of quantization tables prepared on the resolution level basis, the quantization tables storing a set of reference normal vectors quantizing normal line directions of the surface and having different combinations of vector values on the resolution level basis, and replacing the pseudo-normal vector generated on the surface with either one of the reference normal vectors in the quantization table with; and referring to a lookup table of the resolution level corresponding to the level of drawing detail, among a plurality of lookup tables prepared on the resolution level basis, the lookup tables storing indices of the reference normal vectors stored in the quantization tables on the resolution level basis and brightness values of the surface obtained when normal line directions of the surface of the target object are given by the reference normal vectors thereof, in correspondence to each other, and acquiring the brightness value corresponding to the reference normal vector formed on the surface.

Incidentally, any combinations of the foregoing components, and any conversions of expressions of the present invention from/into methods, apparatuses, systems, computer programs, data structures and the like are also intended to constitute applicable aspects of the present invention.

DETAILED DESCRIPTION OF THE INVENTION

Figure 1:
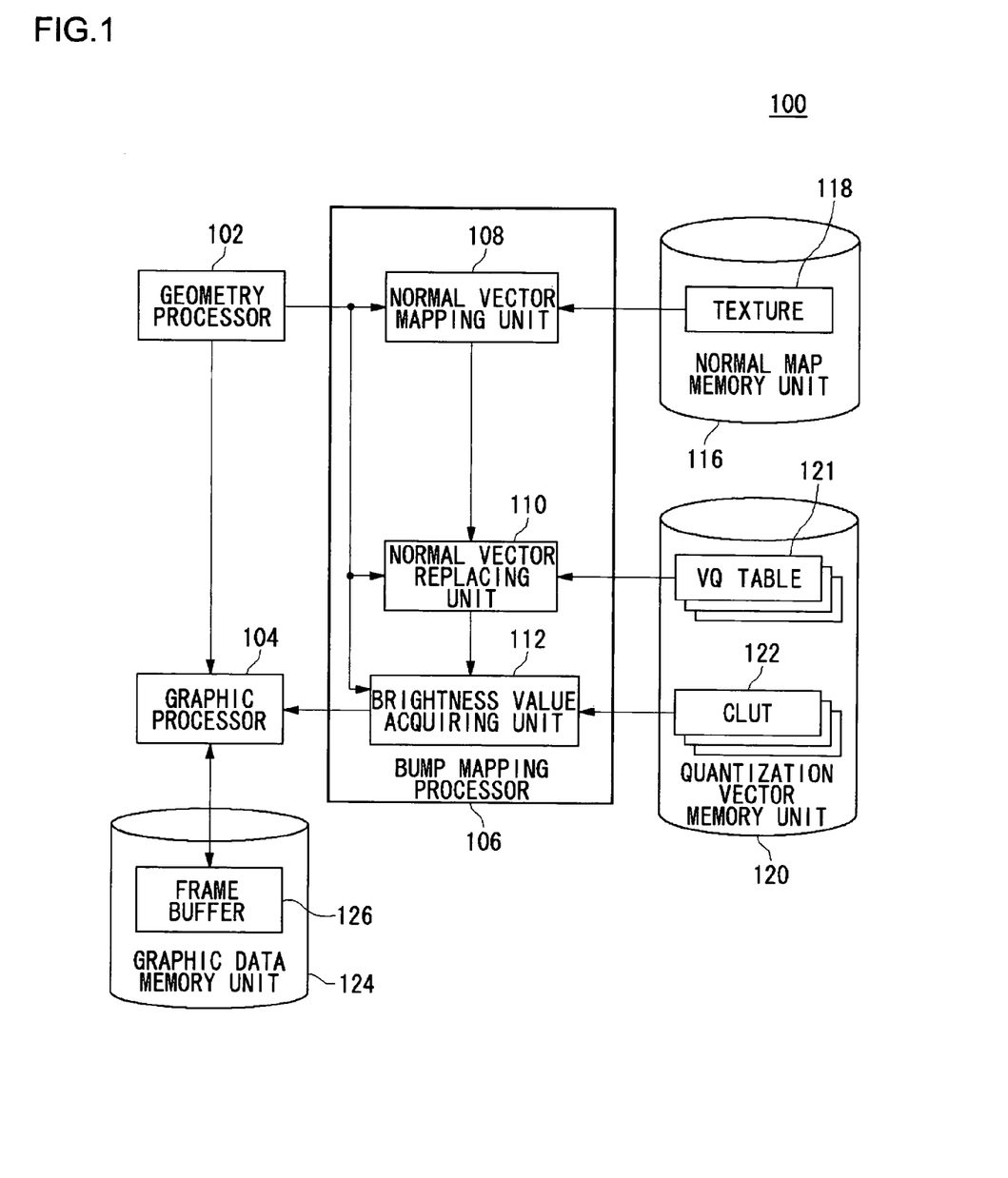
FIG. 1 is a diagram showing the configuration of a graphic processing apparatus according to an embodiment of the invention.

FIG. 1 shows the configuration of the graphic processing apparatus 100 according to an embodiment of the invention. The graphic processing apparatus 100 generates graphic data to be displayed on a display device, on the basis of model information of a three-dimensional object, and performs a bump mapping process as needed to create a fake roughness on a surface of the three-dimensional object.

A geometry processor 102 performs geometry processing on a three-dimensional object and generates a display list comprising polygon definition information including the shape and coordinate position of a polygon and the value of a level of detail (LOD) which indicates how in detail the polygon is drawn. For the polygons on which bump mapping will be performed, the data describing that they are targeted for the bump mapping is added. Whether or not performing bump mapping may be determined in advance when modeling an object, or may be dynamically determined during a drawing process.

A bump mapping processor 106 receives the display list from the geometry processor 102, and performs a bump mapping process on a polygon targeted for bump mapping to create a fake roughness on the polygon surface. The bump mapping process is performed by: preparing in advance a texture having a normal vector as an pixel element, the normal vector being used for creating a fake roughness on a polygon surface; mapping the texture onto a polygon surface according to a method of texture mapping; generating a pseudo-normal vector on the polygon surface; and acquiring a brightness value of the polygon surface.

A graphic processor 104 reads and writes graphic data from and to a frame buffer 126 provided in a graphic data memory unit 124. The graphic processor 104 maps a texture onto a polygon surface and obtains the RGB value of each pixel of the polygon surface. For a polygon on which bump mapping has been performed by the bump mapping processor 106, the graphic processor 104 blends the obtained RGB value with a brightness value obtained by the bump mapping processor 106 to perform shading, and determines the final RGB value, which is in turn written into the frame buffer 126.

The image data thus stored in the frame buffer 126 is converted into video output data and then input to a display device, so that the image of an object, on the surface of which a fake roughness is created by bump mapping, is displayed.

The bump mapping processor 106 of the present embodiment utilizes the technique of "quantization bump mapping," in which pseudo-normal vectors generated on a polygon surface are replaced with reference normal vectors by vector quantization and brightness calculations are performed only on the reference normal vectors.

The bump mapping processor 106 of the embodiment further utilizes the technique of "MIP-map," in which a plurality of textures having different resolutions are prepared, and a texture of the resolution level corresponding to the level of drawing detail of a polygon surface is selected to map it onto the polygon surface.

In the MIP-map technique, a plurality of different size textures are prepared so that a texture having the resolution fitting to the LOD value of a polygon is selected to perform the mapping. Generally, when texture mapping is performed, if the pixel area of a polygon and the size of a texture are significantly different from each other so that the texture must be reduced to be mapped onto the polygon, aliasing occurs in the drawing result and the image quality deteriorates noticeably. Therefore, in the MIP-map technique, the textures with sizes of one-half, one-fourth, one-eighth, etc., of the original texture are prepared in advance and, for example, a texture having a lower resolution is mapped onto a polygon more remote from an observing point. A detailed image with less flicker can thereby be expressed in comparison with the ordinary texture mapping.

The structure of the bump mapping processor 106 will be described in detail below.

A normal vector mapping unit 108 identifies a polygon on which bump mapping is needed, according to the display list generated by the geometry processor 102, and maps normal vectors onto the surface of the identified polygon to create a fake roughness.

Normal vector data used for creating a fake roughness on a polygon surface is stored in a normal map memory unit 116 in the form of a texture 118. The texture 118 stores color data of each pixel when used in the ordinary texture mapping. However, the texture 118 of this embodiment is used as a normal map (also called bump map) that stores the value of the normal vector for each pixel. The normal map can be obtained by differentiating height data indicating the roughness of a two-dimensional surface and then obtaining the normal vectors indicating the normal line directions of the respective pixels.

In the present embodiment, to perform a MIP-map process, a plurality of textures 118 are prepared on a resolution level (referred to below as MIP-map level) basis; a MIP-map level is selected according to the LOD value of a polygon; and the texture 118 corresponding to the MIP-map level is used for bump mapping.

The normal vector mapping unit 108 reads the texture 118 having the MIP-map level corresponding to the LOD value of a polygon from the normal map memory unit 116, and maps the normal vectors stored in the texture 118 onto a polygon surface by using an ordinary texture mapping method. Fluctuation due to the bump mapping is thereby added to the original normal vector indicating a vertical direction of the polygon surface, so that pseudo-normal vectors are generated on the polygon surface.

A normal vector replacing unit 110 performs vector quantization on the pseudo-normal vectors generated on the polygon surface by the normal vector mapping unit 108 to replace them with reference normal vectors. The vector quantization is carried out in such a way that: a predetermined number of reference normal vectors are prepared as representative vectors for arbitrary pseudo-normal vectors to be possibly generated on the surface of a three-dimensional object; and a given pseudo-normal vector is approximated to the nearest reference normal vector. In this case, the number of reference normal vectors is set to less than the number of pseudo-normal vectors generated on a surface of a three-dimensional object.

Combinations of reference normal vectors are stored in a quantization vector memory unit 120 in the form of vector quantization (VQ) tables 121 on a MIP-map level basis. The VQ table 121 is a table that makes the indices and coordinate values of the reference normal vectors correspond to each other.

For example, when a sphere is divided into 256 areas and approximated to a polyhedron having 256 faces, the combination of reference normal vectors in a VQ table 121 comprises 256 normal vectors indicating the vertical directions of the respective divided faces. There is an arbitrariness in choosing the 256 reference normal vectors; if the topology of a polyhedron is changed when dividing a sphere into 256 areas, different 256 reference normal vectors can be obtained. Therefore, a different combination of reference normal vectors is selected for each MIP-map level, and the VQ tables 121 are provided on a MIP-map level basis. If there are eight MIP-map levels from level 0 to level 7, for example, eight VQ tables 121 are provided. In this example, it is assumed that level 0 has the highest resolution and levels 1 through 7 have lower resolutions in this order.

Figure 2:
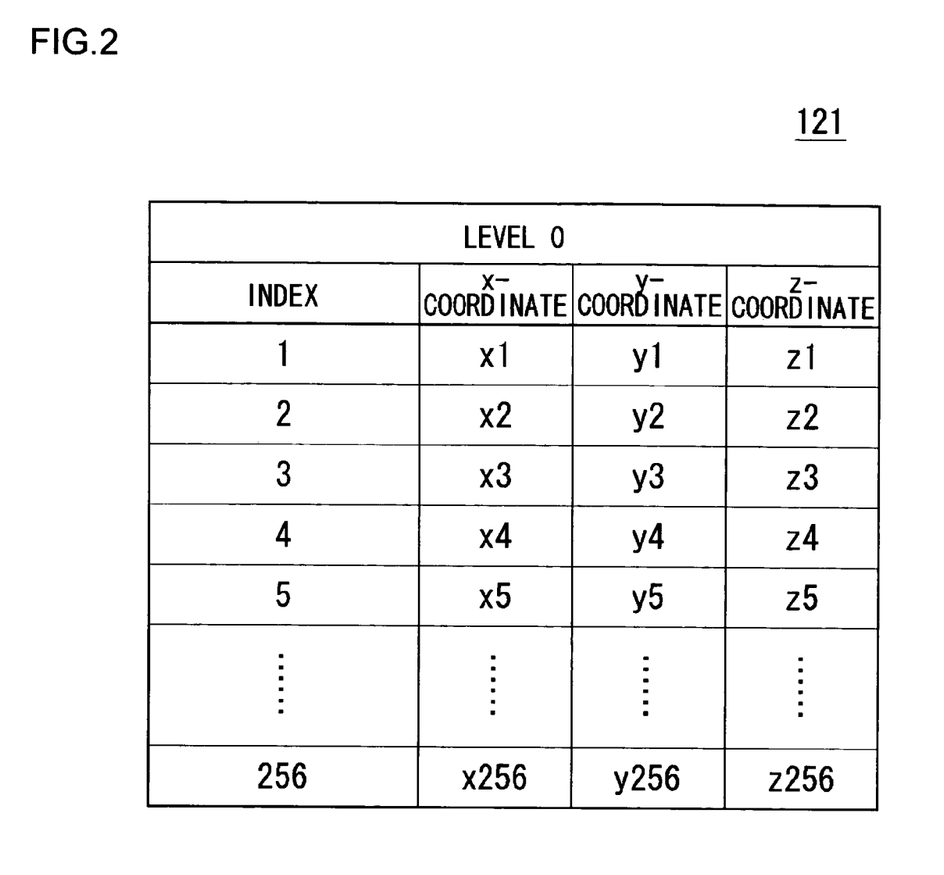
FIG. 2 is a diagram for describing a VQ table in FIG. 1.

FIG. 2 illustrates the VQ table 121 of MIP-map level 0. The three-dimensional coordinate values of the reference normal vectors (x1, y1, z1) through (x256, y256, z256) are made correspond to the indices of the reference normal vectors 1 through 256, respectively. For each of the other MIP-map levels 1 through 7, similarly, the VQ table 121 is set that makes the three-dimensional coordinate values of the reference normal vectors correspond to the indices thereof, wherein the coordinate values of the reference normal vectors of the respective MIP-map levels differ from each other. The use of different combinations of reference normal vectors on a MIP-map level basis can absorb a quantization error caused by the vector quantization.

The number of reference normal vectors may be changed depending on the MIP-map levels. For example, as the resolution decreases, the accuracy may be decreased by reducing the number of reference normal vectors such that the VQ table 121 of MIP-map level 0 is set to have 256 reference normal vectors, that of MIP-map level 1 to have 128 vectors, that of MIP-map level 2 to have 64 vectors, and so on. For example, since a remote object or an unnoticeable object is allowed to be poor in image quality, the VQ table 121 of a low resolution level can be selected to use a less number of reference normal vectors, thereby reducing the process cost at the cost of image quality; for a nearby object or a noticeable object, the VQ table 121 of a high resolution level is selected to use a larger number of reference normal vectors, so that the image quality can be enhanced by expressing the roughness in detail.

The normal vector replacing unit 110 selects the MIP-map level corresponding to the LOD value of a polygon, and refers to the VQ table 121 of this MIP-map level to convert a pseudo-normal vector generated on the polygon surface to the nearest reference normal vector to the pseudo-normal vector.

The quantization vector memory unit 120 stores color lookup tables (referred to below as CLUTs) 122, each of which stores the indices and brightness values of the reference normal vectors in the VQ table 121 in correspondence to each other. If a normal line direction of a surface of an object is assumed to be a reference normal vector in the VQ table 121, a brightness value of the surface can be calculated by performing a shading process, assuming the type and position of a light source. The CLUT 122 is a table that makes the brightness values thus calculated correspond to the indices of reference normal vectors. As the VQ tables 121 are provided on a MIP-map level basis, the CLUTs 122 are also provided on a MIP-map level basis.

Figure 3:
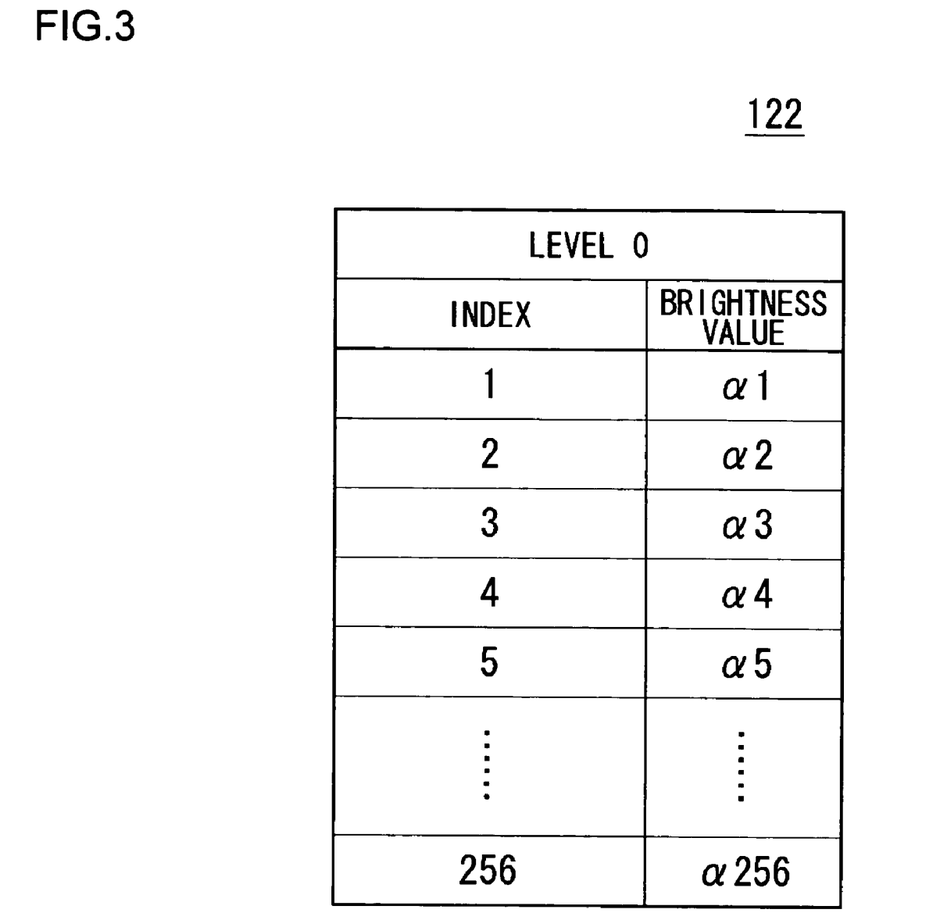
FIG. 3 is a diagram for describing a CLUT in FIG. 1.

FIG. 3 illustrates the CLUT 122 of MIP-map level 0. The indices 1 through 256 of the reference normal vectors and the corresponding brightness values α1 through α256 are stored. On the basis of the coordinate values of the reference normal vectors in the VQ table 121 of the MIP-map level 0 in FIG. 2, brightness calculations are performed on the respective reference normal vectors and the resulting brightness values are stored in correspondence to the indices of the reference normal vectors. This CLUT 122 is referred to obtain the brightness values corresponding to the indices of the reference normal vectors of MIP-map level 0. For the other MIP-map levels 1 to 7, similarly, the brightness values are calculated for the respective reference normal vectors and stored in correspondence to the indices thereof.

A brightness value acquiring unit 112 refers to the CLUT 122 of the MIP-map level corresponding to the LOD value of a polygon, and acquires the brightness values corresponding to the reference normal vectors formed on the polygon surface. The brightness value acquiring unit 112 sends the data describing the brightness values of the polygon surface, which have been determined by bump mapping, to the graphic processor 104.

When MIP-map texture mapping is performed, the image quality is often degraded. This is because, since MIP-map levels are discrete, when the MIP-map levels change on an object surface, the resolutions of the textures to be mapped abruptly change. In addition, when an object onto which a texture has been mapped moves in the depth direction, the MIP-map levels change with depth, so that the resolutions of the textures to be mapped abruptly change. Therefore, flicker occurs on the object surface and the visual appearance often deteriorates.

To avoid these problems, it is common in the MIP-map that the textures of different MIP-map levels are smoothly interpolated between the MIP-map levels to create an intermediate texture. In texture mapping by the MIP-map, trilinear filtering is therefore utilized in which linear interpolations are performed not only between the pixel values in the longitudinal and lateral directions but also between hierarchy levels of the MIP-map resolutions.

In the present embodiment, MIP-map processing using trilinear filtering is adopted to the quantization bump mapping. Since the conventional bump mapping directly manipulates normal vectors, the calculation process needs to be performed directly between the normal vectors to interpolate between the MIP-map levels, so that the process has been complex and difficult to handle. Since the quantization bump mapping is a technique that uses the CLUTs 122 in which the quantized reference normal vectors and brightness values are stored in correspondence to each other, however, it is exactly the same as the ordinary texture mapping in structure, so that the related technology of texture mapping, such as the MIP-map, can be directly utilized. The operation of the bump mapping processor 106 that performs a MIP-map process using trilinear filtering will be described below.

The bump mapping processor 106 refers to the LOD value of a polygon and selects two MIP-map levels corresponding to this LOD value to perform a trilinear interpolation using the textures of the two MIP-map levels.

For example, when the LOD values take values of 0 to 63, sixty-four steps of LOD values are made correspond to eight steps of MIP-map level 0 to 7. If the LOD values having multiplication numbers of eight, i.e., 0, 8, 16, ..., 56, are made correspond to the MIP-map levels 0, 1, 2, ..., 7, respectively, a LOD value that is not a multiple number of eight belongs to the intermediate values between adjacent two MIP-map levels. Therefore, given a LOD value, the adjacent two MIP-map levels that allow the LOD value to belong to the intermediate values therebetween are selected.

The normal vector mapping unit 108 selects the textures 118 of the adjacent two MIP-map levels selected according to the LOD value of a polygon, and maps each of them onto a polygon surface, thereby generating pseudo-normal vectors of the two MIP-map levels on the polygon surface.

The normal vector replacing unit 110 uses the VQ tables 121 of the adjacent two MIP-map levels selected according to the LOD value of the polygon to replace the pseudo-normal vectors of the respective MIP-map levels generated on the polygon surface with reference normal vectors. The two reference normal vectors corresponding to the adjacent two MIP-map levels are thereby formed on the polygon surface.

The brightness value acquiring unit 112 uses the CLUTs 122 of the adjacent two MIP-map levels selected according to the LOD value of the polygon to acquire the brightness values corresponding to the indices of the reference normal vectors of the respective MIP-map levels formed on the polygon surface. In the two MIP-map levels, the brightness values for a pixel of the polygon on which bump mapping is performed are thereby acquired.

The brightness value acquiring unit 112 further performs a linear interpolation between the MIP-map levels on the brightness values thereof to obtain a final brightness value corresponding to the LOD value of the polygon. If a LOD value is 3, for example, since LOD values of 0 and 8 correspond to MIP-map levels 0 and 1, respectively, a brightness value corresponding to a LOD value of 3 is acquired by dividing the difference between the brightness values obtained in MIP-map levels 0 and 1 with a ratio of 3:5.

Brightness values are thus interpolated between the MIP-map levels, whereby image quality deterioration can be prevented that occurs when MIP-map levels change on the surface of an object or when an object moves in the depth direction. In addition, since the interpolation is performed between the MIP-map levels by utilizing the VQ tables 121 that are different according to the MIP-map levels, an effect of a quantization error caused by the vector quantization of pseudo-normal vectors can be reduced.

Figure 4:
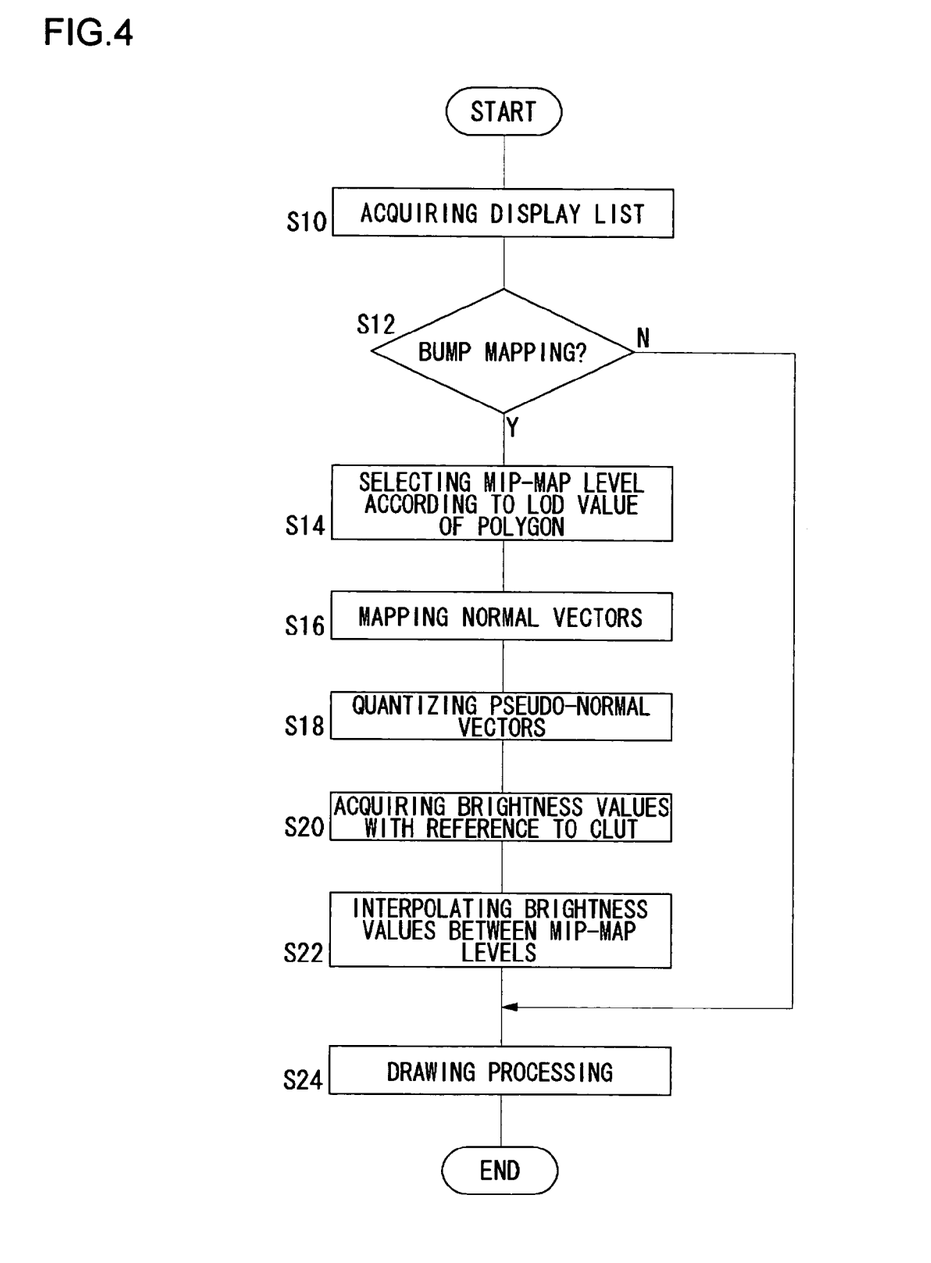
FIG. 4 is a flowchart for describing a drawing procedure by the bump mapping according to the embodiment.

FIG. 4 is a flowchart illustrating a drawing procedure of the bump mapping performed by the graphic processing apparatus 100 having the above structure. The flowchart will be described with reference to FIGS. 5A-5C and FIGS. 6A-6C as needed.

The bump mapping processor 106 acquires a display list including polygon definition information from the geometry processor 102 (S10).

If the acquired display list includes polygons targeted for bump mapping (Y in S12), the bump mapping processor 106 performs bump mapping processes S14 to S22. When a plurality of polygons are targeted for bump mapping, the bump mapping processes are performed on all those polygons. If no polygons are targeted for bump mapping (N in S12), no bump mapping processes are performed, but an ordinary drawing process S24 is only performed.

Whether or not performing bump mapping on a polygon may be determined according to the LOD value of the polygon. For example, when the LOD value is relatively small or when drawing needs to be performed with a high level of detail, bump mapping may be performed, whereas when the LOD value is relatively large or when drawing may be performed with a low level of detail, bump mapping may be omitted.

The bump mapping processor 106 selects the MIP-map level that fits the LOD value of the polygon (S14). When an interpolation between MIP-map levels is performed, the adjacent two MIP-map levels, between which the LOD value belongs to, are selected. When an interpolation between MIP-map levels is not performed, one MIP-map level that is the nearest to the LOD value is selected.

The normal vector mapping unit 108 reads the texture 118 of the relevant MIP-map level from the normal map memory unit 116, and maps the normal vectors stored in the texture 118 onto the polygon surface by a texture mapping method (S16).

Figure 5A:
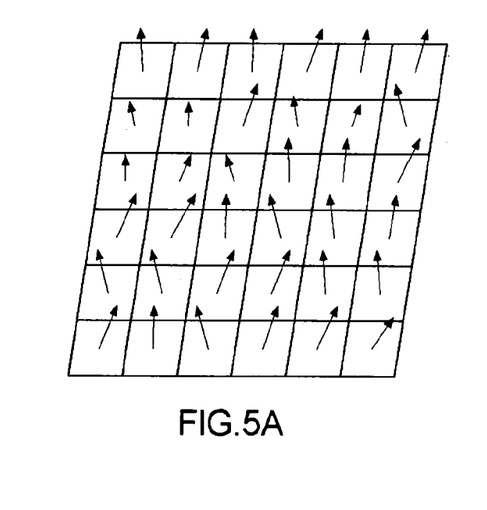
FIGS. 5A-5C are diagrams for describing a process in which the brightness values are mapped onto a polygon surface by the bump mapping.

FIG. 5A illustrates a polygon surface onto which the normal vectors are mapped on a pixel basis. In this example, the polygon surface has a rectangular shape in which there are six by six pixels disposed in both the longitudinal and lateral directions, resulting in the thirty-six pixels in total. The normal vectors stored in the texture 118 are mapped onto the respective pixels, and are combined with the original normal vectors N of the polygon, whereby the pseudo-normal vectors N' of the respective pixels are determined. The drawing shows the pseudo-normal vector N' of each pixel of the polygon surface. A specific method of calculating a pseudo-normal vector N' will be described below.

If a point P(x, y, z) on the polygon surface is described in a parametric coordinate (s, t), the point is described like this: P=[x(s, t), y(s, t), z(s, t)]. Since the tangent vectors in the s-direction and t-direction are given by $P_s$ and $P_t$, respectively, the normal vector N at the point P is given by $N=P_s \times P_t$, where $P_s$ and $P_t$ indicate partial derivatives with respect to s and t, respectively, and the symbol x indicates vector cross product.

If a bump map value is denoted by B and the coordinate of a point on a bump map mapped to a point P(s, t) on the polygon surface is denoted by (u, v), the pseudo-normal vector N' at the point P after bump mapping is calculated by the following equation.

$$N'=N+D$$

$$D=\{B_u(N \times P_t)-B_v(N \times P_s)\}/|N|$$

In the above equation, $B_u$ and $B_v$ are the partial derivatives of the bump map value B with respect to the u-direction and v-direction, respectively.

Next, the normal vector replacing unit 110 refers to the VQ table 121 of the relevant MIP-map level to quantize the pseudo-normal vectors N' generated on the polygon surface to reference normal vectors, and assigns the indices of the reference normal vectors to the respective pixels (S18). The normal vector replacing unit 110 performs quantization by replacing each of the pseudo-normal vectors N' with the nearest reference normal vector $N_q^*$ in the VQ table 121. The nearest reference normal vector $N_q^*$ is obtained by calculating the inner product (N', $N_q$) between a pseudo-normal vector N' and each reference normal vector $N_q$ in the VQ table 121 and then selecting the smallest value of the normalized inner product value (N', $N_q$)/|N'|/|$N_q$|.

Figure 5B:
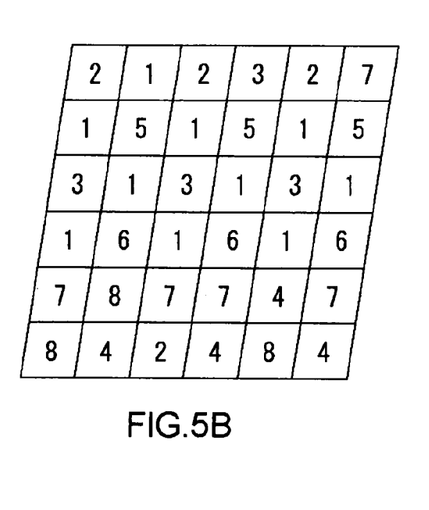

FIG. 5B illustrates the polygon surface having the pixels, onto which the indices of the reference normal vectors $N_q^*$ are mapped. The indices of the reference normal vectors $N_q^*$ are assigned to the respective pixels on the polygon surface. The coordinate values of the reference normal vectors $N_q^*$ are stored in the VQ table 121 and only the index information of the reference normal vectors $N_q^*$ is given to the polygon surface, so that a memory capacity for storing the polygon information can be reduced.

Next, the brightness value acquiring unit 112 refers to the CLUT 122 of the relevant MIP-map level and reads the brightness values α corresponding to the indices of the reference normal vectors $N_q^*$ formed on the polygon surface to assign them to the respective pixels (S20).

Figure 5C:
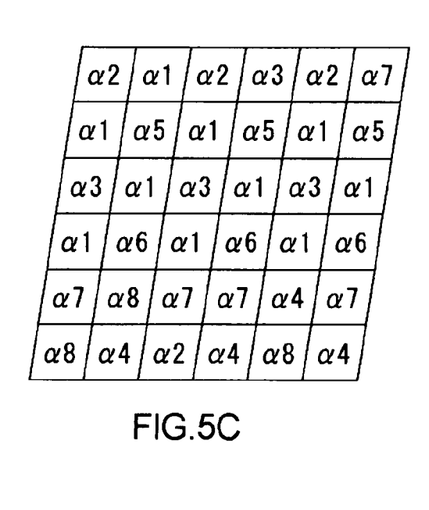

FIG. 5C illustrates the polygon having the pixels onto which the brightness values are mapped. The brightness values α corresponding to the indices of the reference normal vectors $N_q^*$ are assigned to the respective pixels.

The brightness value acquiring unit 112 further performs interpolation on the brightness values between MIP-map levels as needed (S22). When two MIP-map levels are selected, in steps S16 to S20, the generation of the pseudo-normal vectors, the conversion to the reference normal vectors, and the acquisition of the brightness values corresponding to the indices of the reference normal vectors are performed for each of the two MIP-map levels. The brightness value acquiring unit 112 performs a liner interpolation between the brightness values acquired in the two MIP-map levels using an interior division ratio depending on the LOD value to calculate a final brightness value.

Figure 6A:
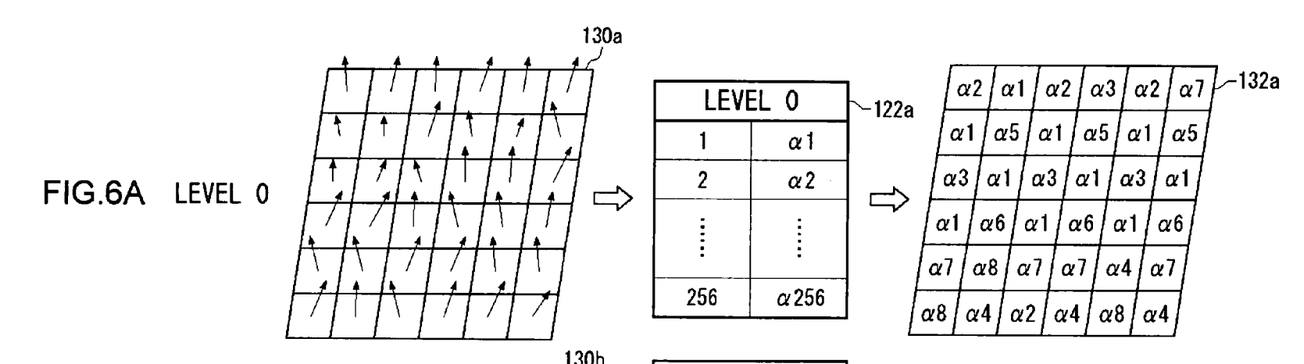
FIGS. 6A-6C are diagrams for describing a process in which the brightness values are mapped onto a polygon surface by the bump mapping in a MIP-map process.
Figure 6B:
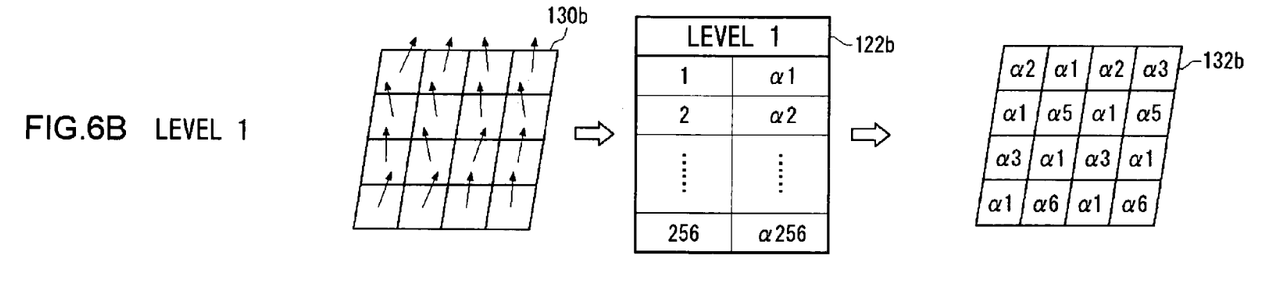
Figure 6C:
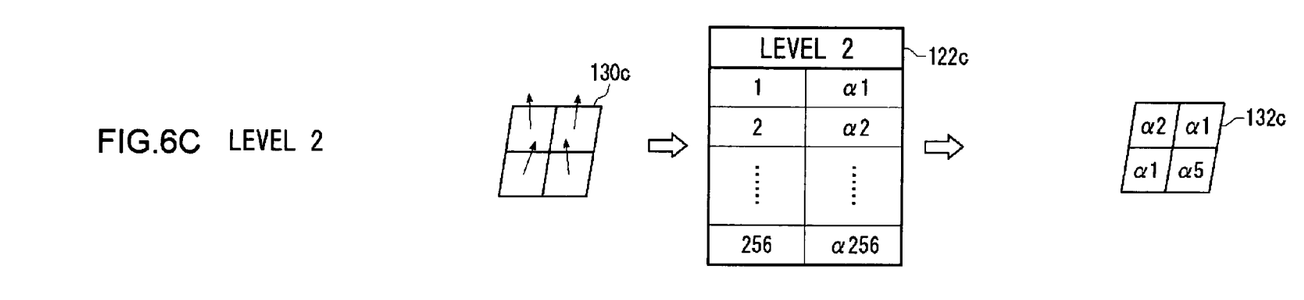

FIG. 6A to FIG. 6C illustrate the bump mapping in a MIP-map process. FIG. 6A illustrates the bump mapping using the texture of MIP-map level 0. The texture of MIP-map level 0 is mapped onto a polygon surface 130a, whereby the pseudo-normal vectors N' are generated in correspondence to the six by six pixels disposed in the longitudinal and lateral directions. The pseudo-normal vector N' of each pixel is quantized to a reference normal vector $N_q^*$ by using the VQ table 121 of MIP-map level 0. The reference normal vector $N_q^*$ is further converted to a brightness value α by using the CLUT 122a of MIP-map level 0, thereby generating a brightness value map 132a in which the brightness values are assigned to the respective pixels.

FIG. 6B illustrates the bump mapping using the texture of MIP-map level 1. The texture of MIP-map level 1 is mapped onto a polygon surface 130b, whereby the pseudo-normal vectors N' are generated in correspondence to the four by four pixels disposed in the longitudinal and lateral directions. The pseudo-normal vector N' of each pixel is quantized to a reference normal vector $N_q^*$ by using the VQ table 121 of MIP-map level 1. The reference normal vector $N_q^*$ is further converted to a brightness value α by using the CLUT 122b of MIP-map level 1, thereby generating a brightness value map 132b in which the brightness values are assigned to the respective pixels.

FIG. 6C illustrates the bump mapping using the texture of MIP-map level 2. The texture of MIP-map level 2 is mapped onto a polygon surface 130c, whereby the pseudo-normal vectors N' are generated in correspondence to the two by two pixels disposed in the longitudinal and lateral directions. The pseudo-normal vector N' of each pixel is quantized to a reference normal vector $N_q^*$ by using the VQ table 121 of MIP-map level 2. The reference normal vector $N_q^*$ is further converted to a brightness value α by using the CLUT 122c of MIP-map level 2, thereby generating a brightness value map 132c in which the brightness values are assigned to the respective pixels.

If the LOD value of a polygon lies between MIP-map levels 0 and 1, for example, the brightness value acquiring unit 112 performs a linear interpolation between the brightness value maps 132a and 132b of the respective MIP-map levels 0 and 1 using an interior division ratio depending on the LOD value to generate an intermediate brightness value map, thereby obtaining the brightness values of the polygon surface.

Different MIP-map levels use different VQ tables 121 to quantize pseudo-normal vectors N', so that even identical pseudo-normal vectors N' are quantized to different reference normal vectors $N_q^*$. Accordingly, the brightness values also result in values slightly different from each other. Performing interpolation between MIP-map levels to obtain a brightness value can reduce a quantization error caused by quantizing a pseudo-normal vector. This is because the use of a plurality of MIP-map levels is equivalent to the use of different combinations of reference normal vectors and therefore to substantially making the quantization granularity fine by increasing the number of reference normal vectors.

When the bump mapping process is completed for the polygons targeted for bump mapping, the graphic processor 104 writes graphic data of the polygons into the frame buffer 126 according to the display list (S24). In a polygon onto which brightness values have been mapped by the bump mapping, the brightness values are reflected on its texture, on which the shading is performed according to the brightness values, whereby fake roughness is expressed. When no texture is mapped onto a polygon surface, the graphic processor 104 may be configured so as to write the brightness values obtained from the bump mapping processor 106 directly into the frame buffer 126 as the RGB values, without any processing.

As described above, according to the present embodiment, since bump mapping is performed by mapping the normal vectors on a pixel basis, a polygon image can be finely expressed in surface roughness. Further, since the use of the quantization bump mapping allows the brightness values to be calculated only for less number of reference normal vectors than the normal vectors to be mapped, the calculation cost for shading processing can be significantly reduced and the bump mapping processing speed can be increased. Furthermore, since the CLUT is used in which the corresponding brightness values can be referred through the indices of the reference normal vectors, a memory capacity necessary for bump mapping can be reduced.

Further, according to the embodiment, a normal map is prepared for each MIP-map level in advance and the normal map of the MIP-map level corresponding to the LOD value of a polygon surface is selected to perform bump mapping, whereby a bump mapping image can be created with a resolution depending on the LOD value.

Furthermore, according to the embodiment, since the MIP-map process using trilinear filtering is used, the quantization noise can be prevented that occurs when the MIP-map levels change. In addition, since different combinations of reference normal vectors are used in different MIP-map levels to quantize pseudo-normal vectors, the deterioration of an image caused by a quantization error in vector quantization can be prevented by interpolating the textures between the MIP-map levels. The quantization bump mapping can reduce the amount of calculations to increase the processing speed, and additionally the interpolation between MIP-map levels can absorb a quantization error to improve the image quality.

As described above, according to the quantization bump mapping of the embodiment, even if the normal vectors to be mapped are sufficiently finely set, the load of the bump mapping processing is determined by the number of reference normal vectors, so that high speed processing is possible while keeping image fineness. The bump mapping processing can thereby be performed in real time even if an object moves or the position of a light source changes.

In addition, the quantization bump mapping utilizing the CLUT is well consistent with MIP-map processing. The adoption of the MIP-map processing by trilinear filtering to the quantization bump mapping can reduce an effect caused by a quantization error in vector quantization, thereby improving the image quality of the bump mapping.

Up to this point, the present invention has been described in conjunction with the embodiment thereof. The embodiment is given solely by way of illustration. It will be understood by those skilled in the art that various modifications may be made to combinations of the foregoing components and processes, and all such modifications are also intended to fall within the scope of the present invention.

In the above embodiment, bump mapping has been performed on a polygon surface basis, but on a larger unit basis, for example, on an object basis the bump mapping may be performed on the surface of an object.

In the above embodiment, a combination of reference normal vectors has been prepared that indicate the normal line directions of the respective divided surfaces obtained by dividing a sphere into 256 areas, and the brightness values for the combination of reference normal vectors have been calculated in advance to store them into the CLUT. The reference normal vectors may be dynamically generated during bump mapping. Alternatively, every time a bump map is mapped onto a polygon surface and pseudo-normal vectors are obtained, the pseudo-normal vectors may be quantized to obtain reference normal vectors, for which the brightness values may be calculated to store them into the CLUT. Although it costs time to perform quantization and to calculate the brightness values on a polygon-by-polygon basis, the process can be optimized for each polygon, thereby improving the image quality.

In the above embodiment, assuming that the type and position of a light source do not change, the brightness values are acquired utilizing the CLUT generated after the brightness calculations have been performed. When the type or position of a light source changes, to update the CLUT, the brightness calculations may be performed again every time it happens.

The number of reference normal vectors can be determined when modeling an object, according to an accuracy required for the quantization bump mapping and requirements for the final image quality. Generally, the number of reference normal vectors is determined by a trade-off between an amount of calculation and image quality. Alternatively, when the needs of image quality changes according to the circumstances, the number of reference normal vectors may be dynamically changed. The number of reference normal vectors may also be changed according to the LOD values. As the level of drawing detail of a polygon increases, for example, accuracy of the bump mapping can be adjusted by increasing the number of reference normal vectors.

In the above description, the brightness values have been interpolated between two MIP-map levels, but a final brightness value corresponding to the LOD value of a polygon may be obtained by interpolating brightness values obtained from three or more MIP-map levels. Since the interpolation function between MIP-map levels is an option, it may be omitted if necessary, according to factors such as, for example, requirements of image quality and a processing performance.

What is claimed is:
1. A graphic processing apparatus comprising:
a normal map memory unit which stores a plurality of normal maps, each having a normal vector as an element and a different resolution, on a resolution level basis;
a normal vector mapping unit which maps the normal map of a resolution level corresponding to a level of drawing detail of a surface of a target object onto the surface to generate a pseudo-normal vector on the surface;
a plurality of quantization tables prepared on the resolution level basis, storing a set of reference normal vectors quantizing normal line directions of the surface and having different combinations of vector values on the resolution level basis; and a normal vector replacing unit which refers to the quantization table of the resolution level corresponding to the level of drawing detail and replaces the pseudo-normal vector generated on the surface with one of the reference normal vectors in the quantization table.

2. The graphic processing apparatus according to claim 1, wherein the number of the reference normal vectors stored in the quantization table is set to less than the number of the different pseudo-normal vectors generated on the surface of the target object.

3. The graphic processing apparatus according to claim 2, further comprising:

a plurality of lookup tables prepared on the resolution level basis, storing indices of the reference normal vectors stored in the quantization tables on the resolution level basis, and brightness values of the surface obtained when normal line directions of the surface of the target object are given by the reference normal vectors, in correspondence to each other; and a brightness value acquiring unit which refers to the lookup table of the resolution level corresponding to the level of drawing detail and acquires the brightness value corresponding to the reference normal vector formed on the surface.

4. The graphic processing apparatus according to claim 3, wherein:

the normal vector mapping unit selects the normal maps of at least two different resolution levels corresponding to the levels of drawing detail and maps the respective normal maps onto the surface to generate a pseudo-normal vector of each resolution level on the surface;

the normal vector replacing unit refers to the quantization tables of the at least two different resolution levels and replaces the pseudo-normal vectors of the respective resolution levels generated on the surface with either the reference normal vectors in the quantization tables of the respective resolution levels; and the brightness value acquiring unit refers to the lookup tables of the at least two different resolution levels, acquires the brightness values corresponding to the reference normal vectors of the respective resolution levels generated on the surface, and interpolates the acquired brightness values between the at least two different resolution levels, to thereby acquire a final brightness value of the surface.

5. The graphic processing apparatus according to claim 2, wherein the number of the reference normal vectors stored in the quantization tables prepared on the resolution level basis is increased as the resolution level becomes higher.

6. The graphic processing apparatus according to claim 1, further comprising:

a plurality of lookup tables prepared on the resolution level basis, storing indices of the reference normal vectors stored in the quantization tables on the resolution level basis, and brightness values of the surface obtained when normal line directions of the surface of the target object are given by the reference normal vectors, in correspondence to each other; and a brightness value acquiring unit which refers to the lookup table of the resolution level corresponding to the level of drawing detail and acquires the brightness value corresponding to the reference normal vector formed on the surface.

7. The graphic processing apparatus according to claim 6, wherein:

the normal vector mapping unit selects the normal maps of at least two different resolution levels corresponding to the levels of drawing detail and maps the respective normal maps onto the surface to generate a pseudo-normal vector of each resolution level on the surface;

the normal vector replacing unit refers to the quantization tables of the at least two different resolution levels and replaces the pseudo-normal vectors of the respective resolution levels generated on the surface with either the reference normal vectors in the quantization tables of the respective resolution levels; and the brightness value acquiring unit refers to the lookup tables of the at least two different resolution levels, acquires the brightness values corresponding to the reference normal vectors of the respective resolution levels generated on the surface, and interpolates the acquired brightness values between the at least two different resolution levels, to thereby acquire a final brightness value of the surface.

8. The graphic processing apparatus according to claim 1, wherein the number of the reference normal vectors stored in the quantization tables prepared on the resolution level basis is increased as the resolution level becomes higher.

9. A graphic processing method performed by a graphic processing apparatus, the method comprising:

mapping by the graphic processing apparatus a normal map of a resolution level corresponding to a level of drawing detail of a surface of a target object onto the surface to generate a pseudo-normal vector on the surface, the normal map being selected from a plurality of normal maps each having a normal vector as an element and a different resolution;

replacing by the graphic processing apparatus the pseudo-normal vector with a quantized reference normal vector by performing quantization depending on the resolution level on the pseudo-normal vector generated on the surface; and acquiring by the graphic processing apparatus a brightness value of the surface on the assumption that a normal line direction of the surface is given by the reference normal vector formed on the surface.

10. The graphic processing method according to claim 9, wherein the acquiring by the graphic processing apparatus of the brightness value includes referring by the graphic processing apparatus to a lookup table storing indices of the quantized reference normal vectors and the brightness values of the surface of the target object in correspondence with each other, the brightness values being obtained on the assumption that normal line directions of the surface are given by the reference normal vectors, and acquiring by the graphic processing apparatus a brightness value corresponding to the reference normal vector formed on the surface.

11. The graphic processing method according to claim 10, wherein:

in generating by the graphic processing apparatus the pseudo-normal vector, the normal maps of at least two different resolution levels corresponding to the levels of drawing detail are selected and each normal map is mapped onto the surface to generate a pseudo-normal vector of each resolution level on the surface;

in replacing by the graphic processing apparatus the pseudo-normal vector with the reference normal vector, different quantizations are performed on a resolution basis on the pseudo-normal vectors of the at least two different resolution levels generated on the surface to replace the pseudo-normal vectors of the respective resolution levels with the reference normal vectors; and in acquiring by the graphic processing apparatus the brightness value, the brightness values of the surface are acquired on a resolution level basis on the assumption that normal line directions of the surface are given by the reference normal vectors of the at least two different resolution levels generated on the surface, and the acquired brightness values are interpolated between the at least two different resolution levels to acquire a final brightness value of the surface.

12. The graphic processing method according to claim 9, wherein:

in generating by the graphic processing apparatus the pseudo-normal vector, the normal maps of at least two different resolution levels corresponding to the levels of drawing detail are selected and each normal map is mapped onto the surface to generate a pseudo-normal vector of each resolution level on the surface;

in replacing by the graphic processing apparatus the pseudo-normal vector with the reference normal vector, different quantizations are performed on a resolution basis on the pseudo-normal vectors of the at least two different resolution levels generated on the surface to replace the pseudo-normal vectors of the respective resolution levels with the reference normal vectors; and in acquiring by the graphic processing apparatus the brightness value, the brightness values of the surface are acquired on a resolution level basis on the assumption that normal line directions of the surface are given by the reference normal vectors of the at least two different resolution levels generated on the surface, and the acquired brightness values are interpolated between the at least two different resolution levels to acquire a final brightness value of the surface.

* * * * *